United States Patent
Chui

(10) Patent No.: US 7,646,529 B2
(45) Date of Patent: Jan. 12, 2010

(54) METHOD AND DEVICE FOR MULTISTATE INTERFEROMETRIC LIGHT MODULATION

(75) Inventor: Clarence Chui, San Jose, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 0 days.

(21) Appl. No.: 12/365,121

(22) Filed: Feb. 3, 2009

(65) Prior Publication Data

US 2009/0135466 A1    May 28, 2009

Related U.S. Application Data

(63) Continuation of application No. 11/235,686, filed on Sep. 26, 2005, now Pat. No. 7,486,429.

(60) Provisional application No. 60/613,891, filed on Sep. 27, 2004.

(51) Int. Cl.
 *G02B 26/00* (2006.01)
 *G02B 26/02* (2006.01)
(52) U.S. Cl. ............... 359/295; 359/290; 359/223
(58) Field of Classification Search ............... 359/295, 359/223–225, 198, 290–292, 245, 260–263, 359/298, 301–303, 317–318
 See application file for complete search history.

(56) References Cited

U.S. PATENT DOCUMENTS

| | | | |
|---|---|---|---|
| 4,954,789 A | 9/1990 | Sampsell | |
| 5,142,414 A | 8/1992 | Koehler | |
| 5,255,093 A | 10/1993 | Topper et al. | |
| 5,396,593 A | 3/1995 | Mori et al. | |
| 5,485,304 A | 1/1996 | Kaeriyama | |
| 5,771,321 A | 6/1998 | Stern | |
| 5,784,189 A | 7/1998 | Bozler et al. | |
| 5,986,796 A | 11/1999 | Miles | |
| 6,040,937 A | 3/2000 | Miles | |

(Continued)

FOREIGN PATENT DOCUMENTS

JP    2002-062490    2/2000

(Continued)

OTHER PUBLICATIONS

ISR and WO for PCT/US05/034814 filed Sep. 26, 2005.

(Continued)

*Primary Examiner*—Scott J Sugarman
*Assistant Examiner*—Dawayne A Pinkney
(74) *Attorney, Agent, or Firm*—Knobbe Martens Olson & Bear LLP

(57) ABSTRACT

A multi-state light modulator comprises a first reflector 104. A first electrode 142 is positioned at a distance from the first reflector 104. A second reflector 14 is positioned between the first reflector 104 and the first electrode 142. The second reflector 14 is movable between an undriven position, a first driven position, and a second driven position, each having a corresponding distance from the first reflector 104. In one embodiment, the light modulator has latch electrodes 17 and 143, which hold the light modulator in a driven state. In another embodiment the latch electrodes 17 and 143 are used to alter the actuation and release thresholds of the light modulator.

25 Claims, 10 Drawing Sheets

U.S. PATENT DOCUMENTS

| | | |
|---|---|---|
| 6,384,953 B1 | 5/2002 | Russell et al. |
| 6,574,033 B1 | 6/2003 | Chui et al. |
| 6,674,562 B1 | 1/2004 | Miles et al. |
| 6,680,792 B2 | 1/2004 | Miles |
| 6,798,560 B2 | 9/2004 | Aubuchon |
| 6,982,820 B2 | 1/2006 | Tsai |
| 7,012,732 B2 | 3/2006 | Miles |
| 7,110,158 B2 | 9/2006 | Miles |
| 7,123,216 B1 | 10/2006 | Miles |
| 7,139,112 B2 | 11/2006 | Whitehead et al. |
| 7,161,728 B2 | 1/2007 | Sampsell et al. |
| 7,256,922 B2 | 8/2007 | Chui et al. |
| 7,310,179 B2 | 12/2007 | Chui et al. |
| 7,327,510 B2 | 2/2008 | Cummings et al. |
| 7,355,782 B2 | 4/2008 | Miles |
| 7,483,197 B2 * | 1/2009 | Miles ......................... 359/290 |
| 7,486,429 B2 | 2/2009 | Chui |
| 2001/0043171 A1 | 11/2001 | Van Gorkom et al. |
| 2002/0051281 A1 | 5/2002 | Ueda et al. |
| 2002/0075555 A1 | 6/2002 | Miles |
| 2003/0053227 A1 | 3/2003 | Kaneko |
| 2004/0008396 A1 | 1/2004 | Stappaerts |
| 2004/0027701 A1 | 2/2004 | Ishikawa |
| 2004/0046920 A1 | 3/2004 | Hayata et al. |
| 2005/0046922 A1 | 3/2005 | Lin et al. |
| 2007/0275491 A1 | 11/2007 | Chui et al. |
| 2008/0084601 A1 | 4/2008 | Miles |
| 2008/0191978 A1 | 8/2008 | Miles |

FOREIGN PATENT DOCUMENTS

| | | |
|---|---|---|
| WO | WO 2004/054088 | 6/2004 |

OTHER PUBLICATIONS

IPRP for PCT/US05/034814 filed Sep. 26, 2005.

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

Office Action dated Dec. 3, 2007 in U.S. Appl. No. 11/235,686.

Office Action dated Jun. 14, 2007 in U.S. Appl. No. 11/235,686.

First Office Action dated Sep. 28, 2007 in Chinese App. No. 200580010486.6.

Second Office Action dated Mar. 21, 2008 in Chinese App. No. 200580010486.6.

* cited by examiner

METHOD AND DEVICE FOR MULTISTATE INTERFEROMETRIC LIGHT MODULATION

CROSS-REFERENCE TO RELATED APPLICATIONS

This application is a continuation of U.S. patent application Ser. No. 11/235,686, titled "METHOD AND DEVICE FOR MULTISTATE INTERFEROMETRIC LIGHT MODULATION," filed Sep. 26, 2005, which claims the benefit of U.S. Provisional Application No. 60/613,891, titled "Systems and Methods for Interferometric Modulation," filed Sep. 27, 2004. The disclosures of the above-reference applications are considered part of the disclosure of this application and are incorporated by reference herein.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment includes a light modulator, including a movable reflector having an electrically conductive material. The movable reflector is positioned between first and second electrodes, and is movable between an undriven position, a first driven position, and a second driven position. The first driven position is closer to the first electrode than is the undriven position and the second driven position is farther from the first electrode than is the undriven position. The light modulator also includes at least one third electrode adjacent to the first electrode, and at least one fourth electrode adjacent to the second electrode.

Another embodiment includes a light modulator, including means for reflecting light positioned between first and second means for positioning the reflecting means. The reflecting means is movable between an undriven position, a first driven position, and a second driven position. The first driven position is closer to the first positioning means than is the undriven position and the second driven position is farther from the first positioning means than is the undriven position. The light modulator also includes third means for positioning the reflecting means adjacent to the first positioning means, and fourth means for positioning the reflecting means adjacent to the second positioning means.

Another embodiment includes a method of driving a MEMS device including first, second, third, and fourth electrodes, and a movable electrode positioned between the first electrode and the second electrode and configured to move to at least two positions therebetween. The method includes applying a first voltage potential difference between the first electrode and the movable electrode so as to drive the movable electrode to a position substantially in contact with a dielectric layer. A force is created attracting the movable electrode towards the dielectric layer. The method also includes applying a second voltage potential difference between the first electrode and the movable electrode and a third voltage potential difference between the second electrode and the movable electrode so as to overcome the force attracting the movable electrode towards the dielectric layer and to drive the movable electrode away from the dielectric layer. Also included in the method is applying a fourth voltage potential difference between the third electrode and the movable electrode, and applying a fifth voltage potential difference between the fourth electrode and the movable electrode. The force attracting the movable electrode towards the dielectric layer is based at least in part on the fourth and fifth voltages.

Another embodiment includes a method of fabricating a multistate light modulator. The method includes forming first and second electrodes, forming a movable reflector including an electrically conductive material, where the movable reflector is positioned between the first and second electrodes, and is movable between an undriven position, a first driven position, and a second driven position. The first driven position is closer to the first electrode than is the undriven position and the second driven position is farther from the first electrode than is the undriven position. The method also includes forming at least one third electrode adjacent to the first electrode, and forming at least one fourth electrode adjacent to the second electrode.

Another embodiment includes a display apparatus including a plurality of display elements, each of the display elements including a movable reflector including an electrically conductive material, where the movable reflector is positioned between first and second electrodes, and is movable between an undriven position, a first driven position, and a second driven position. The first driven position is closer to the first electrode than is the undriven position and wherein the second driven position is farther from the first electrode than is the undriven position, at least one third electrode adjacent to the first electrode, and at least one fourth electrode adjacent to the second electrode.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
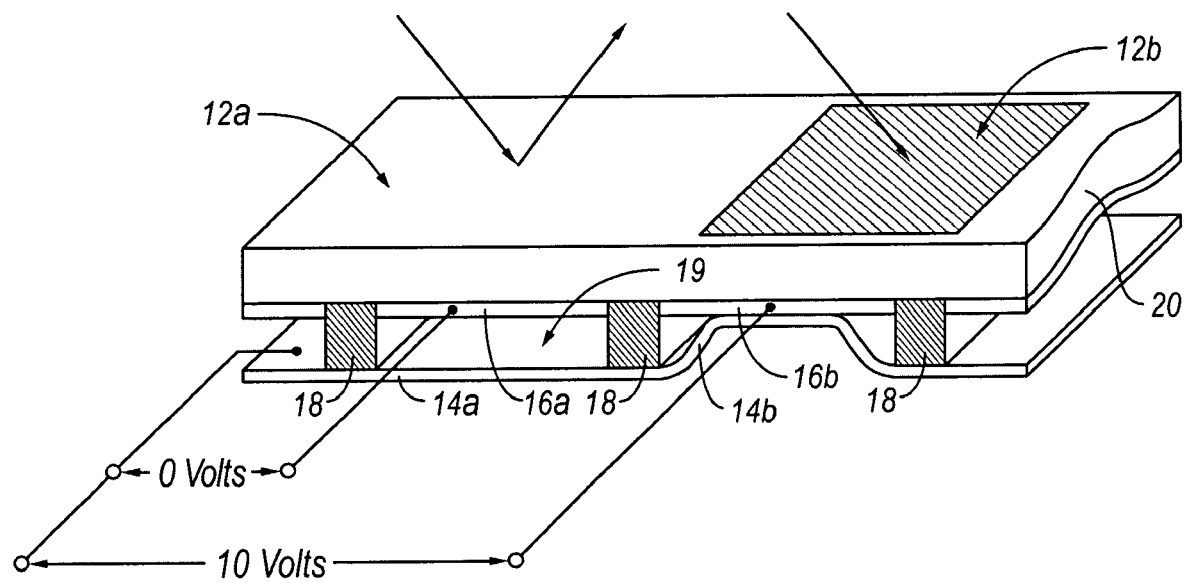
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
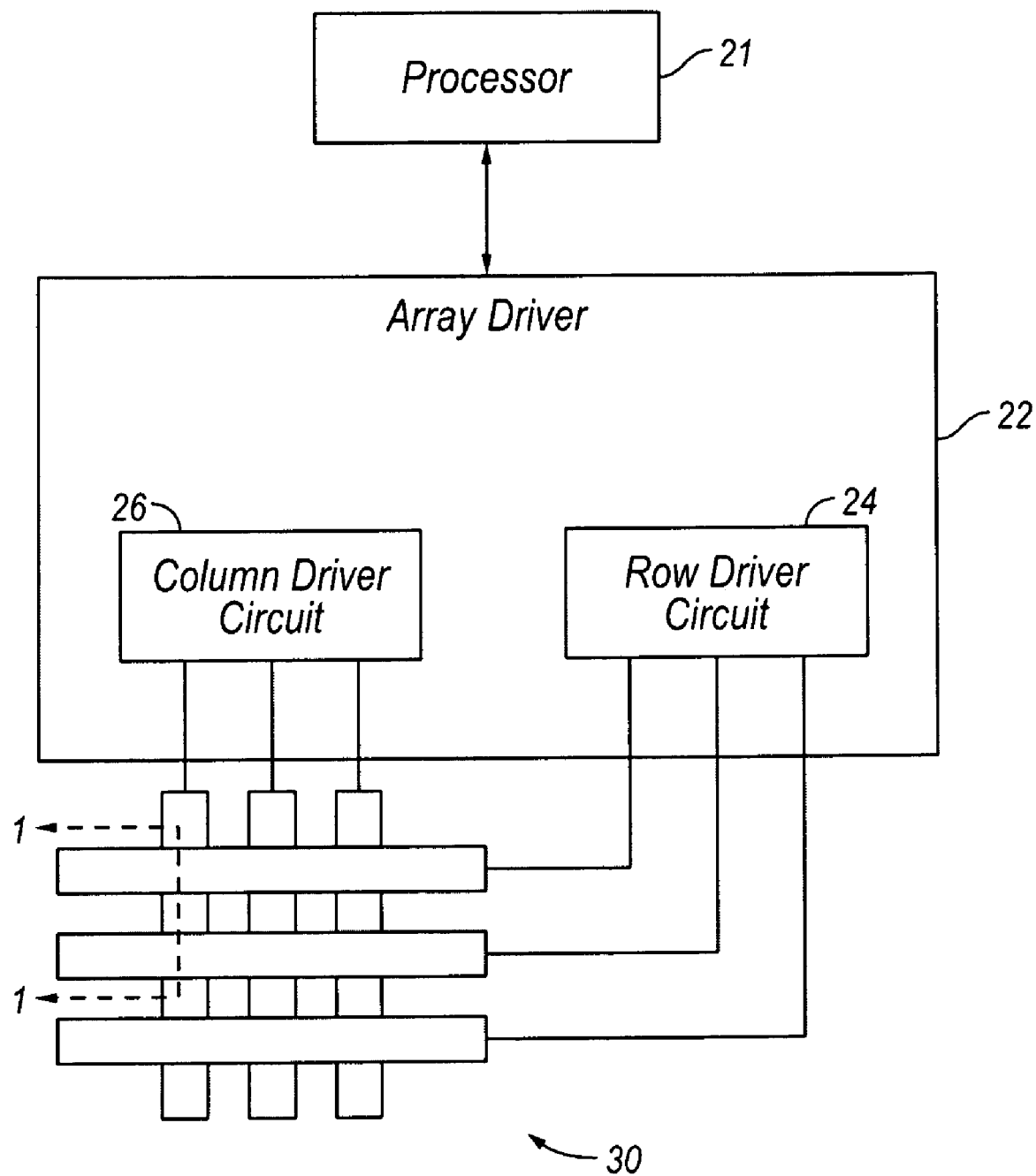
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
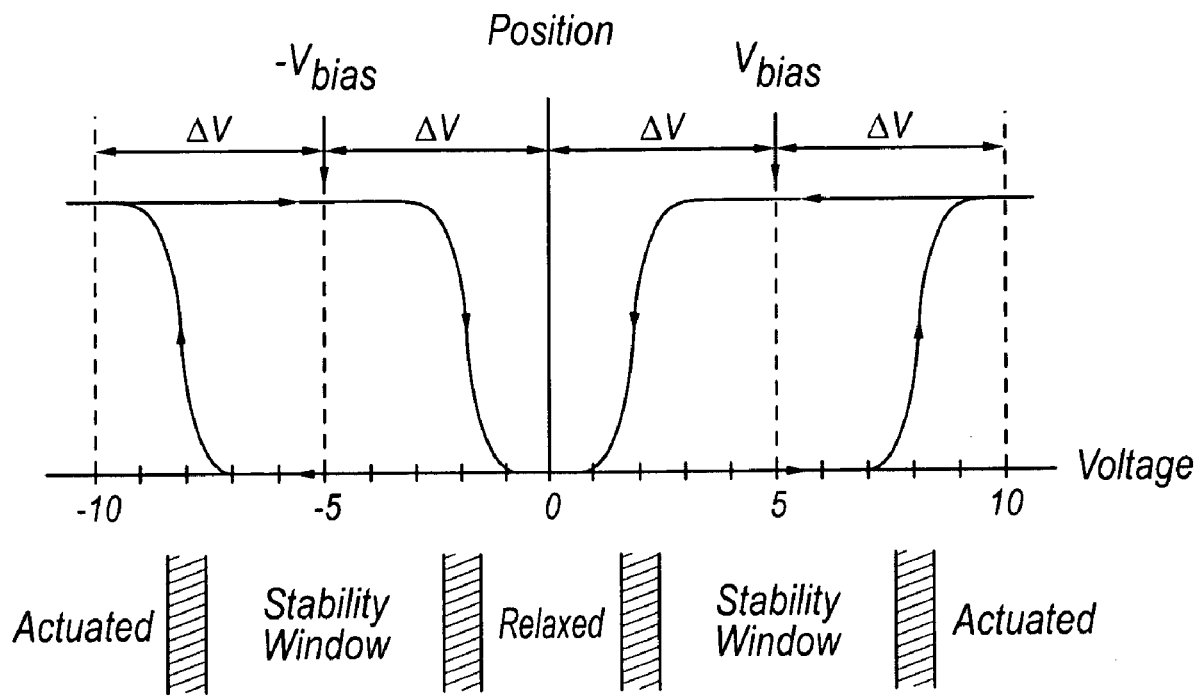
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to +$V_{bias}$, and the appropriate row to the same +$\Delta V$, producing a zero volt potential difference across the pixel. In those rows where the row voltage is held at zero volts, the pixels are stable in whatever state they were originally in, regardless of whether the column is at +$V_{bias}$, or −$V_{bias}$. As is also illustrated in FIG. 4, it will be appreciated that voltages of opposite polarity than those described above can be used, e.g., actuating a pixel can involve setting the appropriate column to +$V_{bias}$, and the appropriate row to −$\Delta V$. In this embodiment, releasing the pixel is accomplished by setting the appropriate column to −$V_{bias}$, and the appropriate row to the same −$\Delta V$, producing a zero volt potential difference across the pixel.

Figure 5A:
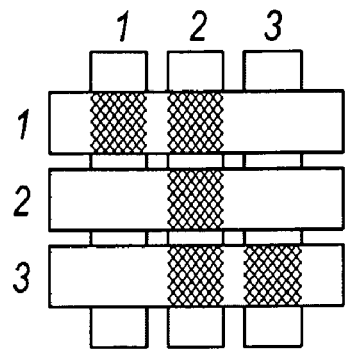
FIGS. 5A and 5B illustrate one exemplary timing diagram for row and column signals that may be used to write a frame of display data to the 3×3 interferometric modulator display of FIG. 2.
Figure 5B:
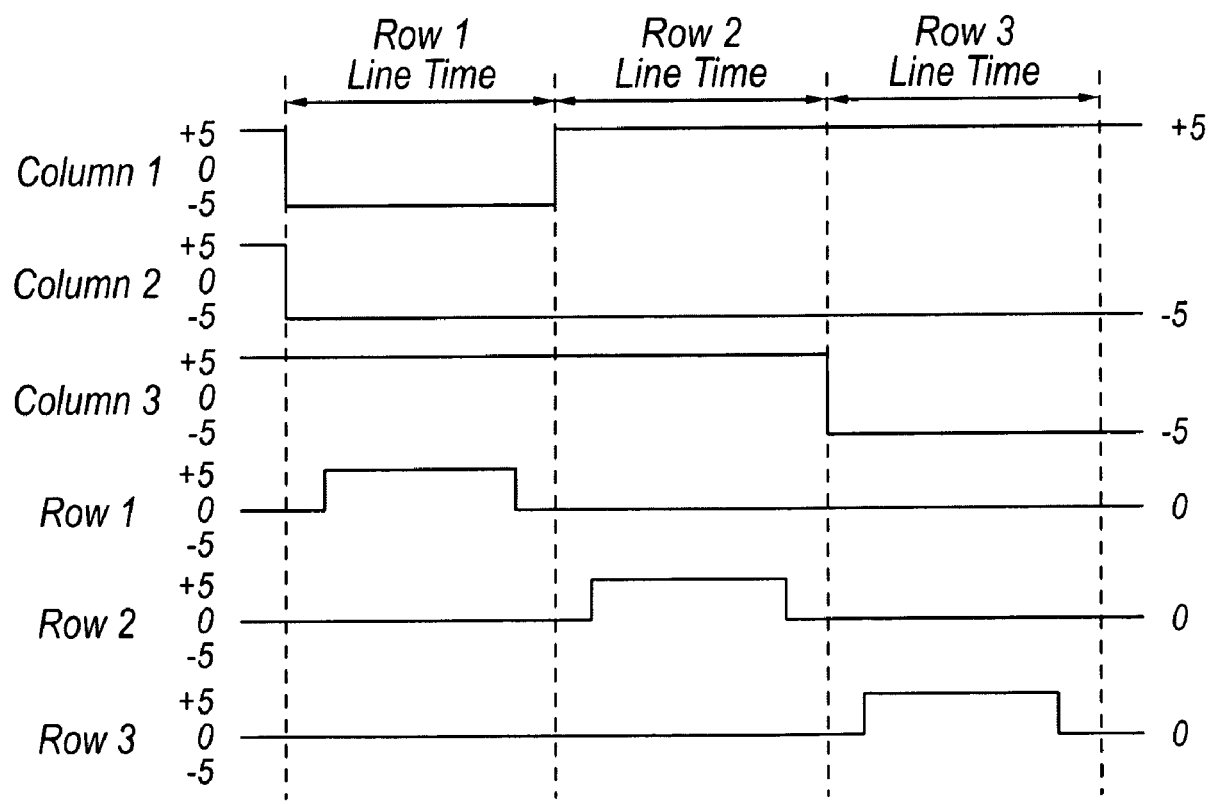

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
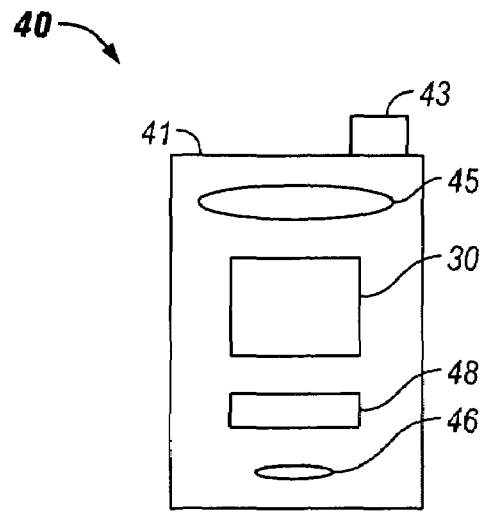
FIGS. 6A and 6B are system block diagrams illustrating an embodiment of a visual display device comprising a plurality of interferometric modulators.
Figure 6B:
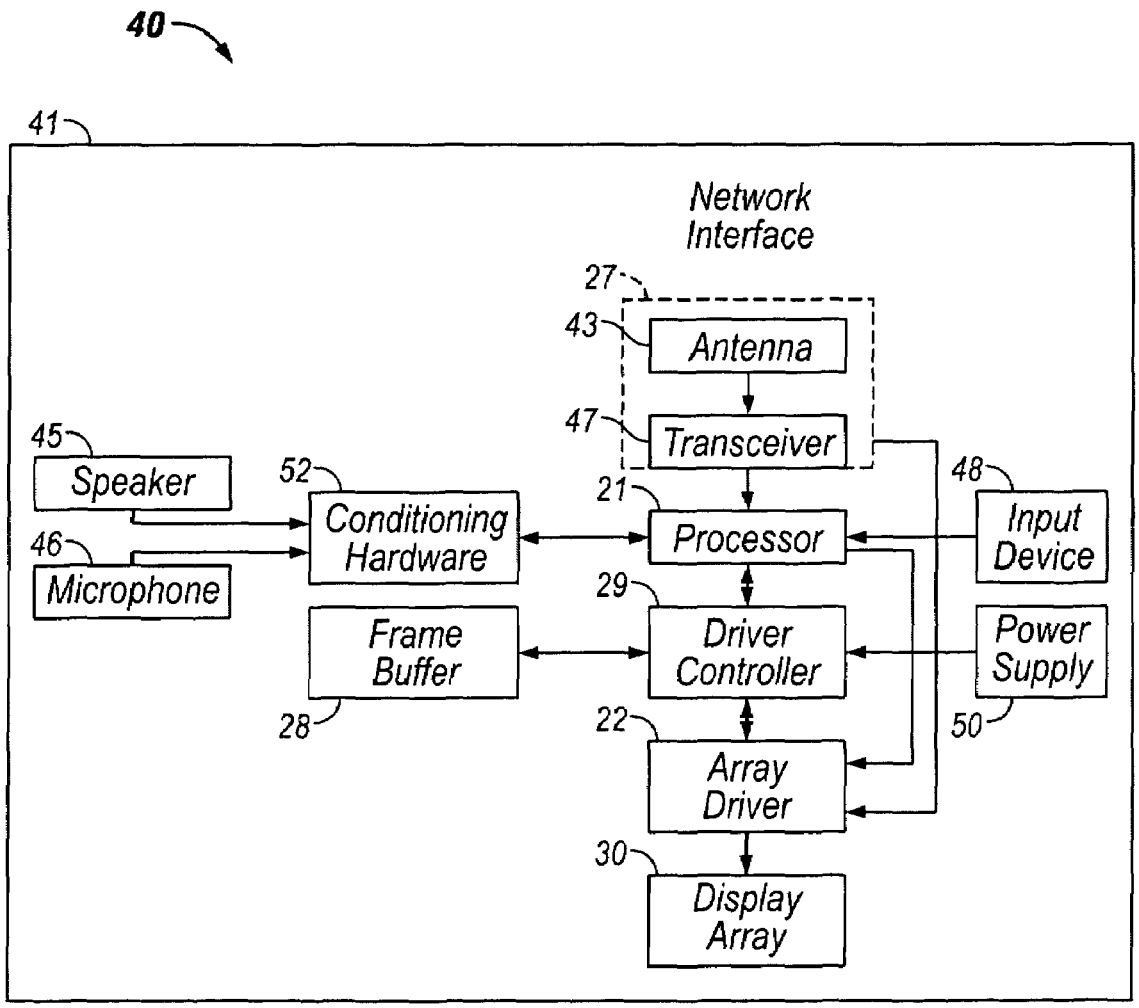

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46.

Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a hi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
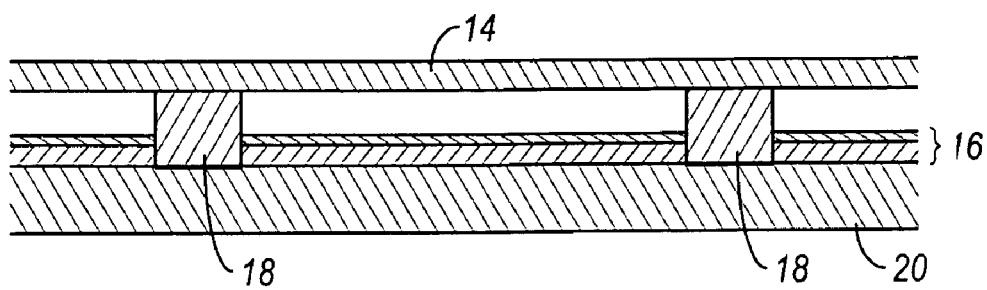
FIG. 7A is a cross section of the device of FIG. 1.
Figure 7B:
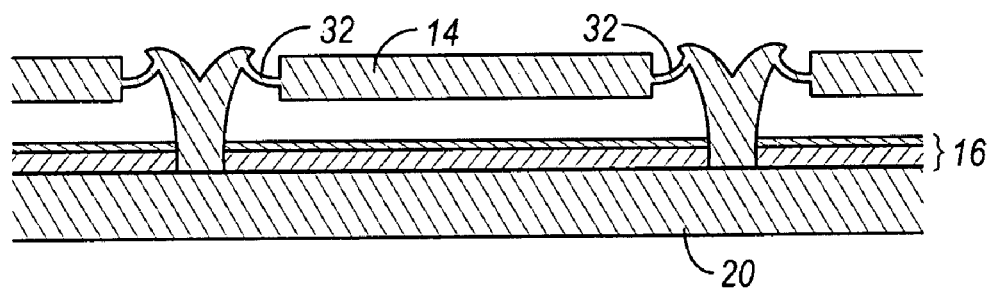
FIG. 7B is a cross section of an alternative embodiment of an interferometric modulator.
Figure 7C:
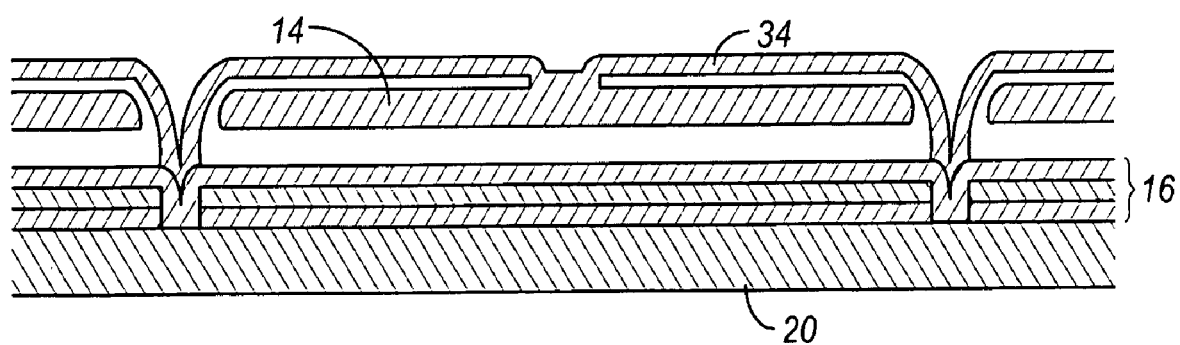
FIG. 7C is a cross section of another alternative embodiment of an interferometric modulator.
Figure 7D:
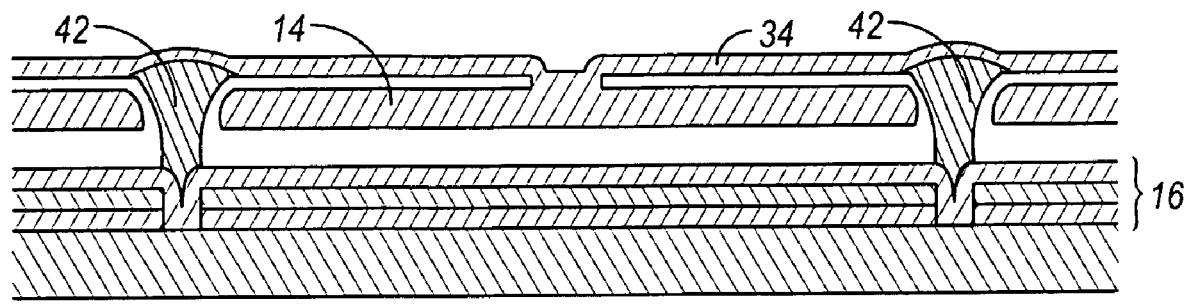
FIG. 7D is a cross section of yet another alternative embodiment of an interferometric modulator.
Figure 7E:
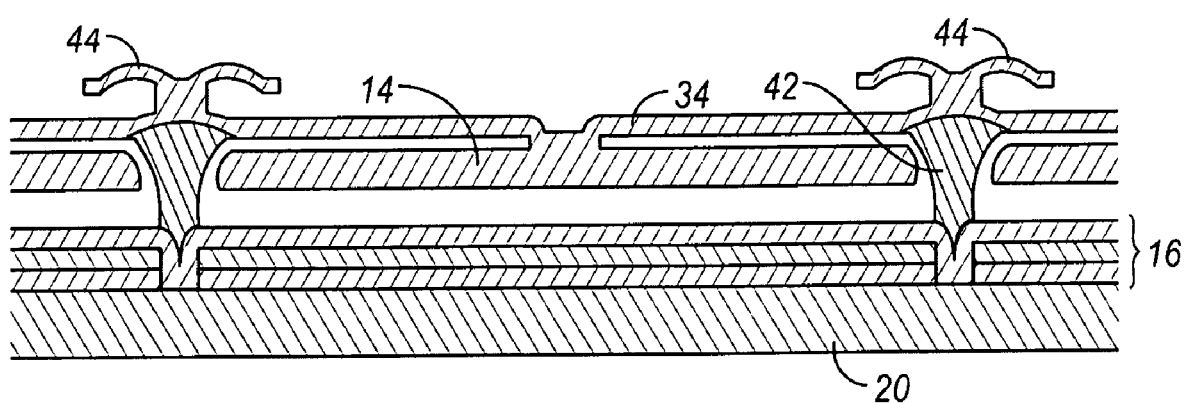
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Embodiments of interferometric modulators described above operate in one of a reflective state, which produces white light, or light of a color determined by the distance between the mirrors 14 and 16, or in a non-reflective, e.g., black, state. In other embodiments, for example, embodiments disclosed in U.S. Pat. No. 5,986,796, the movable mirror 14 may be positioned at a range of positions relative to the fixed mirror 16 to vary the size of the resonant gap 19, and thus the color of reflected light.

Figure 8:
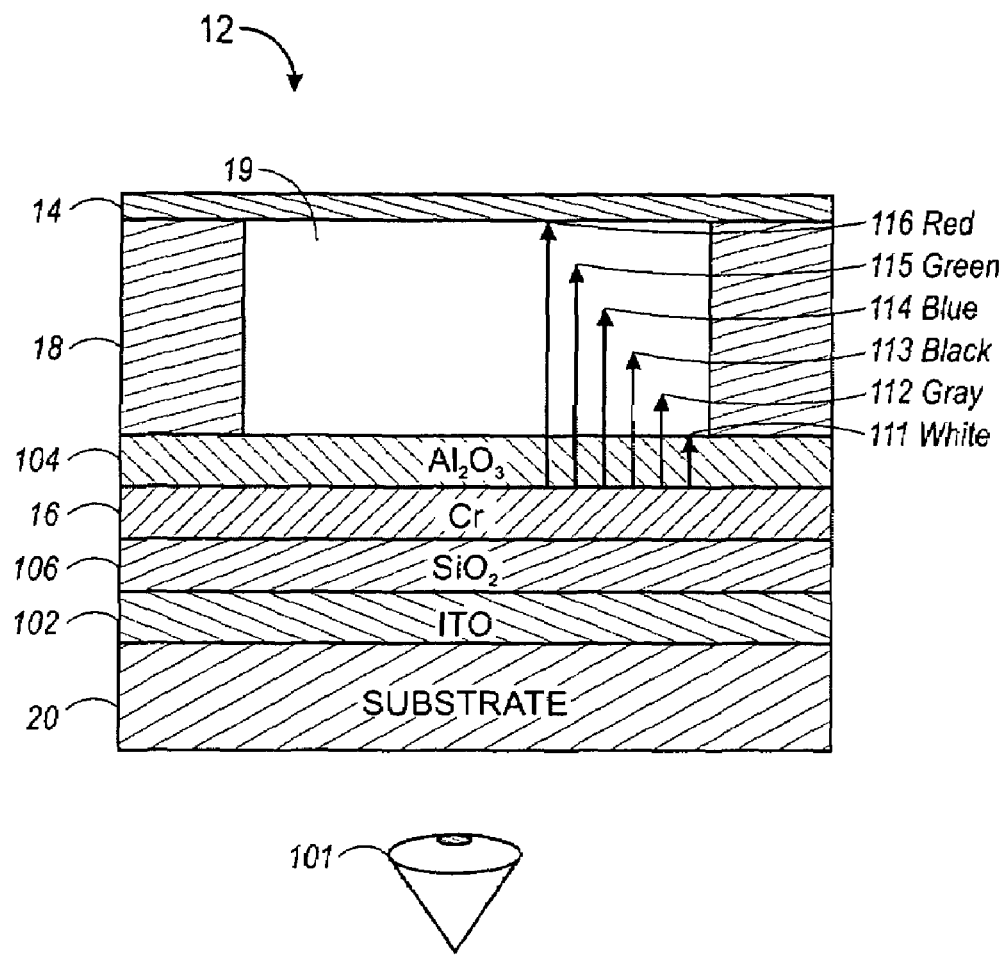
FIG. 8 is a side cross-sectional view of an exemplary interferometric modulator that illustrates the spectral characteristics of produced light.

FIG. 8 is a side cross-sectional view of an exemplary interferometric modulator 12 that illustrates the spectral characteristics of light that would be produced by positioning the movable mirror 14 at a range of positions 111-115. As discussed above, a potential difference between a row and column electrode causes the movable mirror 14 to deflect. The exemplary modulator includes a conductive layer 102 of indium-tin-oxide (ITO) acting as a column electrode. In the exemplary modulator, the mirror 14 includes the row conductor.

In one embodiment, a dielectric layer 104 of a material such as alumina ($Al_2O_3$) is positioned over a layer of chrome that forms a reflective surface of the mirror 16. As discussed above with reference to FIG. 1, the dielectric layer 104 prevents shorting and controls the separation distance between the mirrors 14 and 16 when the mirror 14 deflects. The optical cavity formed between the mirrors 14 and 16 thus includes the dielectric layer 104. The relative sizes of items in FIG. 8 have been selected for purposes of conveniently illustrating the modulator 12. Thus, such distances are not to scale and are not intended to be representative of any particular embodiment of the modulator 12.

Figure 9:
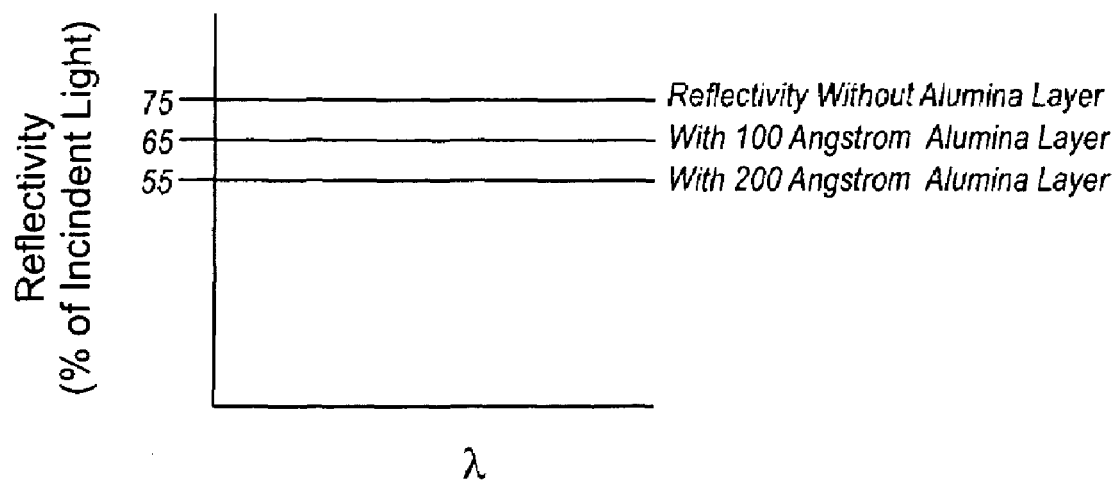
FIG. 9 is a graphical illustration of reflectivity versus wavelength for mirrors of several exemplary interferometric modulators.

FIG. 9 is a graphical illustration of reflectivity versus wavelength for the mirrors 16 of several exemplary optical stacks. The horizontal axis represents a range of wavelengths of visible light incident on the optical stacks. The vertical axis represents the reflectivity of the optical stack as a percentage of incident light at a particular wavelength. In one embodiment, in which the optical stack does not include the dielectric layer 104, the reflectivity of the mirror 16 formed of a layer of chrome is approximately 75%. An optical stack including a dielectric layer 104 comprising a 100 Å layer of alumina results in 65% reflectivity and a dielectric layer 104 comprising a 200 Å layer of alumina results in 55% reflectivity. As shown, reflectivity does not vary according to wavelength in these particular embodiments. Accordingly, by adjusting the thickness of an $Al_2O_3$ layer, the reflectivity of the mirror 16 can be controlled consistently across the visible spectrum to allow specific properties of interferometric modulators 12 to be selected. In certain embodiments, the dielectric layer 104 is a layer of $Al_2O_3$, having a thickness in the range of 50-250 Å. In other embodiments, the dielectric layer 104 comprises a thin layer of $Al_2O_3$, having a thickness in the range of 50-100 Å and a layer of bulk $SiO_2$, having a thickness in the range of 400-2000 Å.

As discussed above, the modulator 12 includes an optical cavity formed between the mirrors 14 and 16. The characteristic distance, or effective optical path length, L, of the optical cavity determines the resonant wavelengths, λ, of the optical cavity and thus of the interferometric modulator 12. The resonant wavelength, λ, of the interferometric modulator 12 generally corresponds to the perceived color of light reflected by the modulator 12. Mathematically, the distance L=½Nλ, where N is an integer. A given resonant wavelength, λ, is thus reflected by interferometric modulators 12 having distances L of ½λ(N=1), λ(N=2), 3/2λ(N=3), etc. The integer N may be referred to as the order of interference of the reflected light. As used herein, the order of a modulator 12 also refers to the order N of light reflected by the modulator 12 when the mirror 14 is in at least one position. For example, a first order red interferometric modulator 12 may have a distance L of about 325 nm, corresponding to a wavelength λ of about 650 nm. Accordingly, a second order red interferometric modulator 12 may have a distance L of about 650 nm. Generally, higher order modulators 12 reflect light over a narrower range of wavelengths and thus produce colored light that is more saturated.

Note that in certain embodiments, the distance, L, is substantially equal to the distance between the mirrors 14 and 16. Where the space between the mirrors 14 and 16 comprises only a gas (e.g., air) having an index of refraction of approximately 1, the effective optical path length is substantially equal to the distance between the mirrors 14 and 16. In embodiments that include the dielectric layer 104, which has an index of refraction greater than one, the optical cavity is formed to have the desired optical path length by selecting the distance between the mirrors 14 and 16 and by selecting the thickness and index of refraction of the dielectric layer 104, or of any other layers between the mirrors 14 and 16. In one embodiment, the mirror 14 may be deflected one or more positions within a range of positions to output a corresponding range of colors. For example, the voltage potential difference between the row and column electrodes may be adjusted to deflect the mirror 14 to one of a range of positions in relation to the mirror 16. In general, the greatest level of control of the position of the mirror by adjusting voltage is near the undeflected position of the path of the mirror 14 (for example, for smaller deflections, such as deflections within about ⅓rd of the maximum deflection from the undeflected position of the mirror 14).

Each of a particular group of positions 111-115 of the movable mirror 14 is denoted in FIG. 8 by a line extending from the fixed mirror 16 to an arrow point indicating the positions 111-115. Thus, the distances 111-115 are selected so as to account for the thickness and index of refraction of the dielectric layer 104. When the movable mirror 14 deflects to each of the positions 111-115, each corresponding to a different distance, L, the modulator outputs light to a viewing position 101 with a different spectral response that corresponds to different colors of incident light being reflected by the modulator 12. Moreover, at position 111, the movable mirror 14 is sufficiently close to the fixed mirror 16, that the effects of interference are negligible and modulator 12 acts as a mirror that reflects substantially all colors of incident visible light substantially equally, e.g., as white light. The broadband mirror effect is caused because the small distance L is too small for optical resonance in the visible band. The mirror 14 thus merely acts as a reflective surface with respect to visible light.

As the gap is increased to the position 112, the modulator 12 exhibits a shade of gray as the increased gap distance between the mirrors 14 and 16 reduces the reflectivity of the mirror 14. At the position 113, the distance L is such that the cavity operates interferometrically but reflects substantially no visible wavelengths of light because the resonant wavelength is outside the visible range.

As the distance L is increased further, a peak spectral response of the modulator 12 moves into visible wavelengths. Thus, when the movable mirror 14 is at position 114, the modulator 12 reflects blue light. When the movable mirror 14 is at the position 115, the modulator 12 reflects green light. When the movable mirror 14 is at the non-deflected position 1116, the modulator 12 reflects red light.

In designing a display using interferometric modulators 12, the modulators 12 may be formed so as to increase the color saturation of reflected light. Saturation refers to the intensity of the hue of color light. A highly saturated hue has a vivid, intense color, while a less saturated hue appears more muted and grey. For example, a laser, which produces a very narrow range of wavelengths, produces highly saturated light. Conversely, a typical incandescent light bulb produces white light that may have a desaturated red or blue color. In one embodiment, the modulator 12 is formed with a distance L corresponding to higher order of interference, e.g., 2nd or 3rd order, to increase the saturation of reflected color light.

An exemplary color display includes red, green, and blue display elements. Other colors are produced in such a display by varying the relative intensity of light produced by the red, green, and blue elements. Such mixtures of primary colors such as red, green, and blue are perceived by the human eye as other colors. The relative values of red, green, and blue in such a color system may be referred to as tristimulus values in reference to the stimulation of red, green, and blue light sensitive portions of the human eye. In general, the more saturated the primary colors, the greater the range of colors that can be produced by the display. In other embodiments, the display may include modulators 12 having sets of colors that define other color systems in terms of sets of primary colors other than red, green, and blue.

Figure 10:
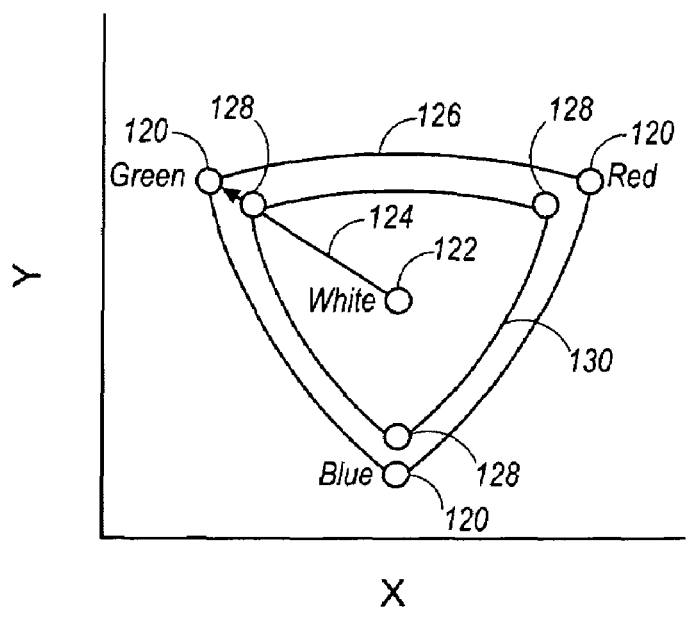
FIG. 10 is a chromaticity diagram that illustrates the colors that can be produced by a color display that includes exemplary sets of red, green, and blue interferometric modulators.

FIG. 10 is a chromaticity diagram that illustrates the colors that can be produced by a color display that includes two sets of exemplary red, green, and blue interferometric modulators. The horizontal and vertical axes define a chromaticity coordinate system on which spectral tristimulus values may be depicted. In particular, points 120 illustrate the color of light reflected by exemplary red, green, and blue interferometric modulators. White light is indicated by a point 122. The distance from each point 120 to the point 122 of white light, e.g., the distance 124 between the point 122 for white and the point 120 for green light, is indicative of the saturation of light produced by the corresponding modulator 12. The region enclosed by the triangular trace 126 corresponds to the range of colors that can be produced by mixing the light produced at points 120. This range of colors may be referred to as the color gamut of the display.

Points 128 indicate the spectral response of another set of exemplary modulators 12. As indicated by the smaller distance between the points 128 and the white point 122 than between points 120 and point 122, the modulators 12 corresponding to the points 128 produce less saturated light that do the modulators 12 corresponding to the points 120. The trace 130 indicates the range of colors that can be produced by mixing the light of points 128. As is shown in FIG. 10, the trace 126 encloses a larger area than does the trace 130, graphically illustrating the relationship between the saturation of the display elements and the size of the color gamut of the display.

In a reflective display, white light produced using such saturated interferometric modulators tends to have a relatively low intensity to a viewer because only a small range of incident wavelengths is reflected to form the white light. In contrast, a mirror reflecting broadband white light, e.g., substantially all incident wavelengths, has a greater intensity because a greater range of incident wavelengths is reflected. Thus, designing reflective displays using combinations of primary colors to produce white light generally results in a tradeoff between color saturation and color gamut and the brightness of white light output by the display.

Figure 11:
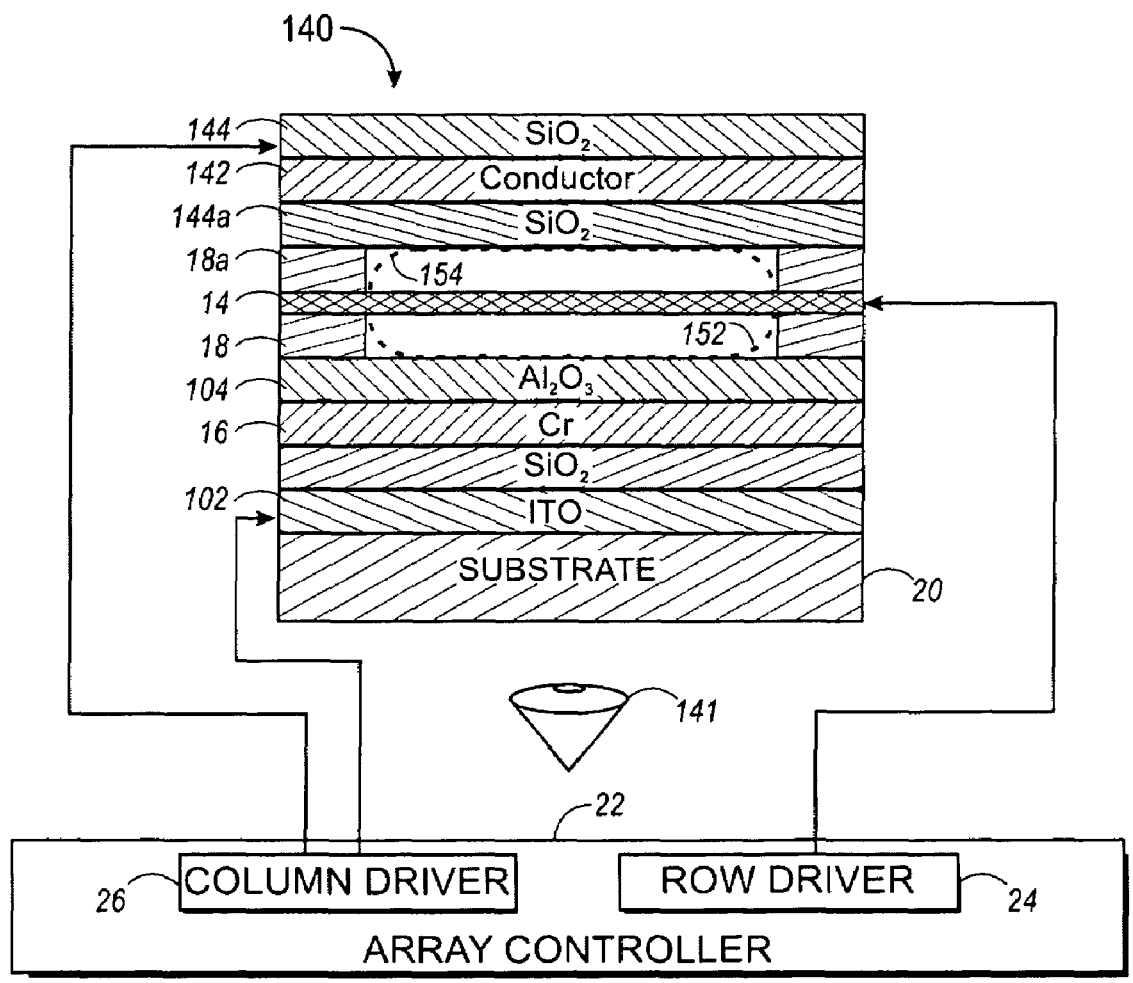
FIG. 11 is a side cross-sectional view of an exemplary multistate interferometric modulator.

FIG. 11 is a side cross-sectional view of an exemplary multistate interferometric modulator 140 that can produce highly saturated color light in one state and relatively intense white light in another state. The exemplary modulator 140 thus decouples color saturation from the brightness of output white light. The modulator 140 includes a movable mirror 14 that is positioned between two electrodes 102 and 142. The modulator 140 also includes a second set of posts 18a that are formed on the opposite side of the mirror 14 as the posts 18.

In certain embodiments, each of the mirrors 14 and 16 may be part of a stack of layers defining a reflector or reflective member that perform functions other than reflecting light. For example, in the exemplary modulator of FIG. 11, the mirror 14 is formed of one or more layers of a conductive and reflective material such as aluminum. Thus, the mirror 14 may also function as a conductor. Similarly, the mirror 16 may be formed of one or more layers of reflective material and one or more layers of an electrically conductive material so as to perform the functions of the electrode 102. Furthermore, each of the mirrors 14 and 16 may also include one or more layers having other functions, such as to control the mechanical properties affecting deflection of the mirror 14. In one embodiment, the moveable mirror 14 is suspended from an additional deformable layer such is described in connection with FIG. 7C.

In one embodiment that includes modulators that reflect red, green, and blue light, different reflective materials are used for modulators that reflect different colors so as to improve the spectral response of such modulators 12. For example, the movable mirror 14 may include gold in the modulators 12 configured to reflect red light.

In one embodiment, dielectric layers 144 may be positioned on either side of the conductor 142. The dielectric layers 144a and 104 advantageously prevent electrical shorts between conductive portions of the mirror 14 and other portions of the modulator 140. In one embodiment, the mirror 16 and the electrode 102 collectively form a reflective member.

In the exemplary embodiment, the distance between fixed mirror 16 and the movable mirror 14 in its undriven position corresponds to the optical path length L in which the modulator 140 is non-reflective or "black." In the exemplary embodiment, the optical path length between the fixed mirror 16 and the movable mirror 14 when driven towards the fixed mirror 16 corresponds to the optical path length L in which the modulator 140 reflects white light. In the exemplary embodiment, the distance between the fixed mirror 16 and the movable mirror 14 when driven towards the conductor 142 corresponds to the optical path length L in which the modulator 140 reflects light of a color such as red, blue, or green. In certain embodiments, the distance between the undriven movable mirror 14 and the fixed mirror 16 is substantially equal to the distance between the undriven movable mirror 14 and the electrode 142. Such embodiments may be considered to be two modulators positioned around the single movable mirror 14.

When a first voltage potential difference is applied between the mirror 14 and the electrode 102, the mirror 14 deflects towards the mirror 16 to define a first optical path length, L, that corresponds to a first driven state. In this first driven state, the movable mirror 14 is closer to the mirror 16 than in the undriven state. When a second voltage potential difference is applied between the mirror 14 and the electrode 142, the mirror 14 is deflected away from the mirror 16 to define a second optical path length, L, that corresponds to a second driven state. In this second driven state, the movable mirror 14 is farther from the mirror 16 than in the undriven state. In certain embodiments, at least one of the first driven state and second driven state is achieved by applying voltage potential differences both between the mirror 14 and the electrode 102 and between the mirror 14 and the electrode 142. In certain embodiments, the second voltage difference is selected to provide a desired deflection of the mirror 14.

As illustrated in FIG. 11, in the first driven state, the mirror 14 deflects to a position indicated by the dashed line 152. In the exemplary modulator 140, the distance between the mirrors 14 and 16 in this first driven state corresponds to the thickness of the dielectric layer 104. In the exemplary modulator 140, the mirror 14 acts as a broadband mirror in this position, substantially reflecting all visible wavelengths of light. As such, the modulator 140 produces a broadband white light when illuminated by broadband white light.

In the second driven state, the mirror 14 deflects to a position indicated by the dashed line 154. In the exemplary modulator 140, this distance corresponds to a color of light, e.g., blue light. In the undriven state, the mirror 14 is positioned as shown in FIG. 11. In the undetected position, the mirror 14 is spaced at a distance from the mirror 16 so that substantially no visible light is reflected, e.g., an "off" or non-reflective state. Thus, the modulator 140 defines an interferometric modulator having at least three discrete states. In other embodiments, the positions of the movable mirror 14 in the three states may be selected so as to produce different sets of colors, including black and white, as desired.

In one embodiment, light enters the modulator 12 through the substrate 20 and is output to a viewing position 141. In another embodiment, the stack of layers illustrated in FIG. 11 is reversed, with layer 144 closest to the substrate 20 rather than layer 102. In certain such embodiments, the modulator 12 may be viewed through the opposite side of the stack from the substrate 20 rather than through the substrate 20. In one such embodiment, a layer of silicon dioxide is formed on the ITO layer 102 to electrically isolate the ITO layer 102.

As noted above, having a separate state for outputting white light in a modulator 140 decouples the selection of the properties of the modulator controlling color saturation from the properties affecting the brightness of white output. The distance and other characteristics of the modulator 140 may thus be selected to provide a highly saturated color without affecting the white light produced in the first state. For example, in an exemplary color display, one or more of the red, green, and blue modulators 12 may be formed with optical path lengths L corresponding to a higher order of interference.

The modulator 140 may be formed using lithographic techniques known in the art, and such as described above with reference to the modulator 12. For example, the fixed mirror 16 may be formed by depositing one or more layers of chromium onto the substantially transparent substrate 20. The electrode 102 may be formed by depositing one or more layers of a transparent conductor such as ITO onto the substrate 20. The conductor layers are patterned into parallel strips, and may form columns of electrodes. The movable mirror 14 may be formed as a series of parallel strips of a deposited metal layer or layers (orthogonal to the column electrodes 102) deposited on top of posts 18 and an intervening sacrificial material deposited between the posts 18. Vias through one or more of the layers described above may be provided so that etchant gas, such as xenon diflouride, can reach the sacrificial layers. When the sacrificial material is etched away, the deformable metal layers are separated from the fixed layers by an air gap. A highly conductive and reflective material such as aluminum may be used for the deformable layers, and these strips may form row electrodes in a display device. The conductor 142 may be formed by depositing posts 18a over the movable mirror 14, depositing an intervening sacrificial material between the posts 18a, depositing one or more layers of a conductor such as aluminum on top of the posts 18a, and depositing a conductive layer over the sacrificial material. When the sacrificial material is etched away, the conductive layer can serve as the electrode 142 which is separated from the mirror 14 by a second air gap. Each of the air gaps provides a cavity in which the mirror 14 may move to achieve each of the states described above.

As further illustrated in FIG. 11, in the exemplary modulator 140, the conductive mirror 14 is connected to the row driver 24 of the array controller 22. In the exemplary modulator 140, the conductors 102 and 142 are connected to separate columns in the column driver 26. In one embodiment, the state of the modulator 140 is selected by applying the appropriate voltage potential differences between the mirror 14 and the column conductors 102 and 142 according to the method described with reference to FIGS. 3 and 4.

Figure 12A:
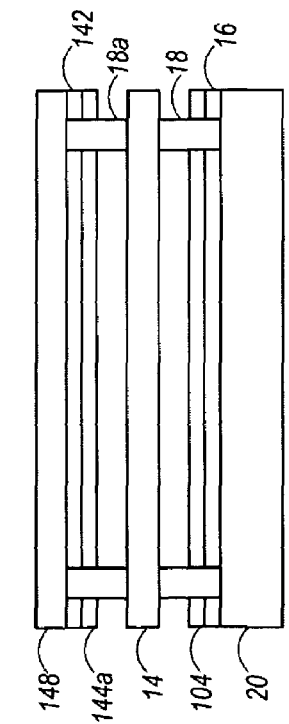
FIGS. 12A-12C are side cross-sectional views of another exemplary multistate interferometric modulator.
Figure 12B:
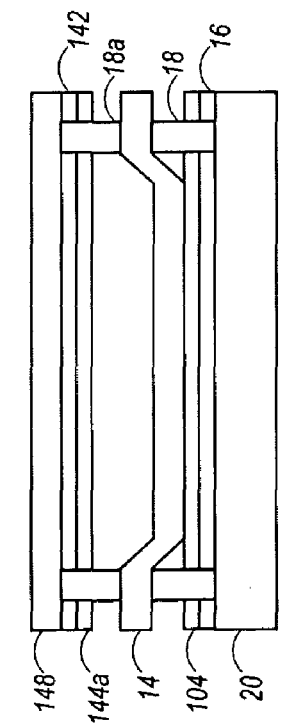
Figure 12C:
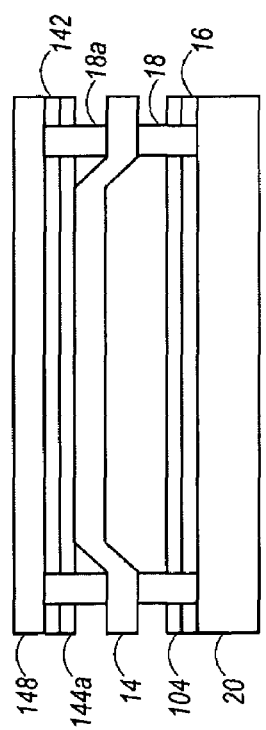

FIGS. 12A-12C illustrate another exemplary interferometric modulator 150 that provides more than two states. In the exemplary modulator 150, the mirror 16 includes both a reflective layer and a conductive layer so as to perform the function of the electrode 102 of FIG. 11. The conductive layer 142 can also be protected by a second dielectric layer 144a and supported by a support surface 148 that is maintained some distance above the movable mirror 14 through a second set of supports 18a.

FIG. 12A illustrates the undriven state of the modulator 150. As with the modulator 140 of FIG. 11, the mirror 14 of the exemplary modulator 150 of FIGS. 12A-12C is deflectable towards the dielectric layer 104 (e.g., downwards), as in the driven state illustrated FIG. 12B, and is deflectable in the reverse or opposite direction (e.g., upwards), as illustrated in FIG. 12C. This "upwardly" deflected state may be called the "reverse" driven or actuated state and the "downwardly" deflected state may be called the "forward" driven or actuated state.

As will be appreciated by one of skill in the art, this reverse driven state can be achieved in a number of ways. In one embodiment, the reverse driven state is achieved through the use of an additional charge plate or conductive layer 142 that can electrostatically pull the mirror 14 in the upward direction, as depicted in FIG. 12C. The exemplary modulator 150 includes what is basically two interferometric modulators positioned symmetrically around a single movable mirror 14. This configuration allows each of the conductive layer of the mirror 16 and the conductive layer 142 to attract the mirror 14 in opposite directions.

In certain embodiments, the additional conductive layer 142 may be useful as an electrode in overcoming stictional forces that may develop when the mirror 14 comes in close proximity, or contacts, the dielectric layer 104. These forces can include van der Waals or electrostatic forces, as well as other possibilities as appreciated by one of skill in the art. In one embodiment, a voltage pulse applied to the conductive layer of the mirror 16 may send the movable mirror 14 into the forward driven state of FIG. 12B. Similarly, the next voltage pulse can be applied to the conductive layer 142 to attract the movable mirror 14 away from the mirror 16. In certain embodiments, such a voltage pulse applied to the conductive layer 142 can be used to accelerate the recovery of the movable mirror 14 back to the undriven state illustrated in FIG. 12A from the forward driven state illustrated in FIG. 12B by driving the movable mirror 14 towards the reverse driven state. Thus, in certain embodiments, the modulator 150 may operate in only two states, the undriven state of FIG. 12A and the forward driven state of FIG. 12B, and can employ the conductive layer 142 as an electrode to help overcome stictional forces. In one embodiment, the conductive layer 142 may be driven as described above each time that the modulator 150 changes from the reverse driven position of FIG. 12C to the undriven position of FIG. 12A.

As will be appreciated by one of skill in the art, not all of these elements will be required in every embodiment. For example, if the precise relative amount of upward deflection (e.g., as shown in FIG. 12C) is not relevant in the operation of such embodiments, then the conductive layer 142 can be positioned at various distances from the movable mirror 14. Thus, there may be no need for support elements 11a, the dielectric layer 144a, or a separate support surface 148. In these embodiments, it is not necessarily important how far upward the movable mirror 14 deflects, but rather that the conductive layer 142 is positioned to attract the mirror 14 at the appropriate time, such as to unstick the modulator 12. In other embodiments, the position of the movable mirror 14 as shown in FIG. 12C, may result in altered and desirable optical characteristics for the interferometric modulator. In these embodiments, the precise distance of deflection of the movable mirror 14 in the upward direction can be relevant in improving the image quality of the device.

As will be appreciated by one of skill in the art, the materials used to produce the layers 142, 144a, and support surface 148 need not be similar to the materials used to produce the corresponding layers 16, 104 and 20. For example, light need not pass through the layer 148. Additionally, if the conductive layer 142 is positioned beyond the reach of the movable mirror 14 in its deformed upward position, then the modulator 150 may not include the dielectric layer 144a. Additionally, the voltages applied to the conductive layer 142 and the movable mirror 14 can be accordingly different based on the above differences.

As will be appreciated by one of skill in the art, the voltage applied to drive the movable mirror 14 from the forward driven state of FIG. 12B, back to the undriven state of FIG. 12A, may be different than that required to drive the movable mirror 14 from the undriven state of FIG. 12A to the upward or reverse driven state of FIG. 12C, as the distance between the conductive layer 142 and movable mirror 14 may be different in the two states. Such requirements can depend upon the desired application and amounts of deflection, and can be determined by one of skill in the art in view of the present disclosure.

Figure 13A:
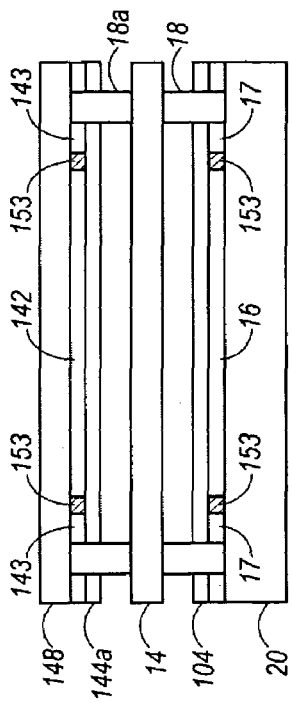
FIGS. 13A-13C are side cross-sectional views of an exemplary multistate interferometric modulator having latch electrodes.
Figure 13B:
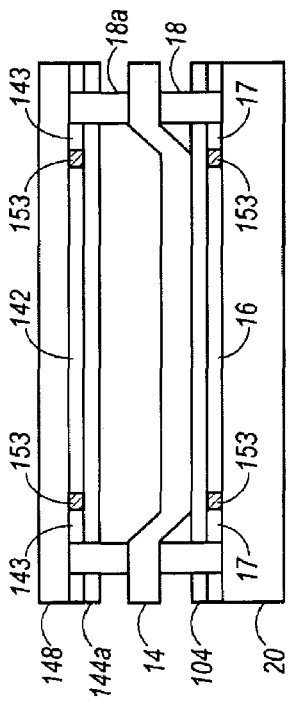
Figure 13C:
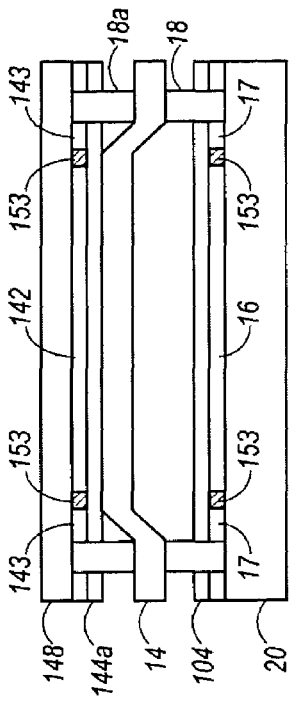

In some embodiments, the amount of force or duration that a force is applied between the conductive layer 142 and the movable mirror 14 is such that it only increases the rate at which the interferometric modulator transitions between the forward driven state and the undriven state. Since the movable mirror 14 can be attracted to either conductive layer 142 or the conductive mirror 16, which are located on opposite sides of movable mirror 14, a very brief driving force can be provided to weaken the interaction of movable mirror 14 with the opposite layer. For example, as the movable mirror 14 is driven to interact with fixed conductive mirror 16, a pulse of energy to the opposite conductive layer 142 can be used to weaken the interaction of the movable mirror 14 and the fixed mirror 16, thereby make it easier for the movable mirror 14 to move to the undriven state. FIGS. 13A-13C are cross-sectional side views of an interferometric modulator that is similar to the interferometric modulator of FIGS. 12A-12C, except for the addition of "latch" electrodes 17 and 143, electrically isolated by dielectric 153, that are described in further detail below. In FIG. 13A, the interferometric modulator is shown in the undriven position with the moveable mirror 14 in a mechanically relaxed state. FIG. 13B shows the interferometric modulator in a forward actuated state and FIG. 13C shows the interferometric modulator in a reverse actuated state.

In one embodiment, a relatively low voltage may initially be applied to electrodes 17 and/or 143, creating a voltage difference between the electrodes 17 and/or 143 and the moveable mirror 14. In advantageous embodiments of this design, this voltage difference is not of sufficient magnitude to cause the moveable mirror 14 to deform from the undriven state into either the forward actuated state or the reverse actuated state, but is sufficient to hold the moveable mirror 14 in the forward actuated state or reverse actuated state once it is placed in that state. Subsequent to the application of the relatively low voltage to the electrodes 17 and/or 143, an actuation voltage may be applied to electrode 16 or electrode 142 that creates a voltage difference between the moveable mirror 14 and the electrode 16 or the electrode 142 that is of sufficient magnitude to cause the moveable mirror 14 to move towards the electrode 16 or the electrode 142. After the device is actuated or reverse actuated by this applied voltage, the voltage on electrode 16 or the electrode 142 may be removed. Because of the close proximity of the moveable mirror 14 and the electrodes 17 or 143, the moveable mirror 14 is then maintained in the actuate or reverse actuated position by the voltage difference between the latch electrode 17 or the latch electrode 143 and the moveable mirror 14 even though the voltage applied to the latch electrode 17 or the latch electrode 143 is not high enough to actuate or reverse actuate the device from the undriven initial state. In one embodiment, the voltage applied to latch electrodes 17 and/or 143 is in the range of 1-10 volts, while the voltage applied to electrode 16 or electrode 142 is in the range of 5-15 volts. It will be appreciated that the voltage applied to the latch electrodes 17 and/or 143 could be applied after the voltage applied to the electrode 16 or the electrode 142.

Once the mirror 14 is latched by the latch electrode 17 or 143, the corresponding electrode 16 or 142, respectively, may be reduced or may be undriven. This is advantageous, for example, in a drive scheme where a single interferometric modulator driver may be used to drive multiple interferometric modulator elements. In some embodiments once an element is driven to the desired state, the latch electrode 17 or 143 can hold the interferometric modulator in that state while the driver disconnects from the electrode 16 and/or 142 to drive another interferometric modulator element, leaving the electrode 16 and/or 142 undriven.

The movement of the movable mirror 14 shown in FIGS. 13A-13C is governed by the electrostatic forces acting upon it. The latch electrodes 17 and 143 are additional contributors to the forces acting upon the movable mirror 14. The position of the mirror 14 is, therefore, a function of the voltage difference between the mirror 14 and each of the electrodes 16, 142, 17 and 143. Accordingly, electrodes 17 and 143 allow for additional control over the movement of the movable mirror 14.

For example, if a voltage (with respect to the movable mirror 14) is placed on electrode 17 there will be a corresponding attractive force between the movable mirror 14 and the electrode 17. This force may not be enough to actuate the mirror 14 itself, but will reduce the voltage between the mirror 14 and the electrode 16 required to actuate the mirror 14. Thus, placing a voltage on electrode 17 lowers the actuation threshold. Similarly, the force between the mirror 14 and the electrode 17 will reduce the voltage on electrode 16 at which the mirror returns to the undriven state (release threshold). Indeed, when used as a latch, the voltage on electrode 16 is such that even reducing the voltage difference between the mirror 14 and the electrode 16 to zero is insufficient to cause the mirror 14 to return to the undriven state. Similarly, placing a voltage on electrode 143 induces an electrostatic force between the mirror 14 and electrode 143. This force works against the actuation of the mirror downward, and therefore increases the actuation threshold and reduces the release threshold.

The effect of voltages on latch electrodes 17 and 143 on the actuation and release thresholds for electrode 16 are analogous to the effect of voltages on latch electrodes 17 and 143 on the reverse actuation and release thresholds for electrode 142. The polarity of the effect of the voltages is, however, reversed. Where a voltage on 17 reduces the actuation threshold and reduces the release threshold of electrode 16, it increases the reverse actuation threshold and increases the release threshold of electrode 142. Similarly, where a voltage on 143 increases the actuation threshold and increases the release threshold of electrode 16, it decreases the reverse actuation threshold and decreases the release threshold of electrode 142.

Because the voltages of the latch electrodes 17 and 143 can be varied in time and independently, each of the actuation and release thresholds can be individually manipulated. For example, when the mirror 14 is in the undriven state the voltages on the latch electrodes 17 and 143 will affect the actuation and reverse actuation thresholds. Once the mirror 14 is in either the forward actuated or reverse actuated states, the voltages on electrodes 17 and/or 143 may be changed to alter the release threshold to a desired level.

Such control over the actuation and release thresholds, and therefore the hysteresis curves of the interferometric modulator allows for calibration of the thresholds. For example, because of processing variations, the thresholds of the individual; interferometric modulators may not be as well matched as is desired. Proper use of the latch electrodes can correct for the mismatch. Additionally, there may be a desired relationship between the actuation/release behavior and the reverse actuation/release behavior of individual interferometric modulators. For example, it may be desired that the actuation threshold be substantially identical to the reverse actuation threshold. As these behaviors can be individually manipulated, the desired relationship may be attained.

In some embodiments, the voltages on electrodes 17 and 143 may be controlled to tune the position of the mirror 14 in its undriven state. Because of processing uncertainties, the precision of the position of the undriven mirror 14 may not be sufficiently controlled. The forces generated between the mirror 14 and the electrodes 17 and 143 may be used to correct the position.

It will be appreciated that the location of the various components shown in FIGS. 13A-13C can be varied widely. For example, the latch electrodes may extend further toward and/or under the support posts. Additionally, the latch electrodes may be in a plane different than the electrode 16, for example, above or below. In addition, only one, or more than two latch electrodes could be provided. An important feature is that the latch electrode(s) be placed in a position that provides the latch function. In the embodiment of FIGS. 13A-13C, it is advantageous to have at least a portion of the latch electrodes placed beneath the point where the moveable material contacts the dielectric.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A light modulator, comprising:
a movable reflector comprising an electrically conductive material, the movable reflector positioned between a first set and a second set of electrodes, the movable reflector being movable between an undriven position, a first driven position, and a second driven position, wherein the first driven position is closer to the first set of electrodes than is the undriven position and wherein the second driven position is farther from the first set of electrodes than is the undriven position;
wherein the first set of electrodes drives the movable reflector to the first driven position;
wherein the second set of electrodes drives the movable reflector to the second driven position; and further comprising
a third set of electrodes configured to modify at least one of a actuation and a release threshold of the movable reflector; and
a fourth set of electrodes configured to modify at least one of a reverse actuation and a reverse release threshold of the movable reflector.

2. The modulator of claim 1, wherein the modulator substantially absorbs incident visible light when the movable reflector is in the undriven position.

3. The modulator of claim 1, wherein the modulator reflects white light when the movable reflector is in the first driven position.

4. The modulator of claim 1, wherein the modulator selectively reflects light in a range of visible wavelengths associated with a color when the movable reflector is in the second driven position.

5. The modulator of claim 1, wherein the movable reflector remains in the first driven position when the voltage potential is removed from the first set of electrodes.

6. The modulator of claim 1, wherein the movable reflector remains in the second driven position when the voltage potential is removed from the second set of electrodes.

7. The modulator of claim 1, further comprising:
a processor that is in electrical communication with at least one of the first and second electrodes, the processor being configured to process image data; and
a memory device in electrical communication with the processor.

8. The modulator of claim 7, further comprising a driver circuit configured to send at least one signal to at least one of the first, second, third and fourth set of electrodes.

9. The modulator of claim 8, further comprising a controller configured to send at least a portion of the image data to the driver circuit.

10. The modulator of claim 7, further comprising an image source module configured to send the image data to the processor.

11. The modulator of claim 10, wherein the image source module comprises at least one of a receiver, transceiver, and transmitter.

12. The modulator of claim 7, further comprising an input device configured to receive input data and to communicate the input data to the processor.

13. The modulator of claim 1 wherein the sets of electrodes comprise one to two electrodes.

14. The modulator of claim 1 wherein the first set of electrodes and the third set of electrodes are both used to drive the movable reflector to the first driven position.

15. The modulator of claim 1 wherein the second set of electrodes and the fourth set of electrodes are both used to drive the movable reflector to the second driven position.

16. A light modulator, comprising:
means for reflecting light positioned between first and second means for positioning the reflecting means, the reflecting means being movable between an undriven position, a first driven position, and a second driven position, wherein the first driven position is closer to the first positioning means than is the undriven position and wherein the second driven position is farther from the first positioning means than is the undriven position;
third means for modifying at least one of a actuation and a release threshold of the movable reflector; and fourth means for modifying at least one of a reverse actuation and a reverse release threshold of the movable reflector.

17. The modulator of claim 16, wherein the reflecting means comprises a movable reflector comprising an electrically conductive material.

18. The modulator of claim 17, wherein the first, second, third, and fourth positioning means each comprise a set of electrodes.

19. The modulator of claim 16 wherein the first means for positioning the reflecting means and the third means for maintaining the reflecting means are both used to drive the reflecting means to the first driven position.

20. The modulator of claim 16 wherein the second means for positioning the reflecting means and the fourth means for maintaining the reflecting means are both used to drive the reflecting means to the second driven position.

21. A method of driving a MEMS device comprising first, second, third, and fourth electrodes, and a movable electrode positioned between the first electrode and the second electrode and configured to move to at least two positions therebetween, the method comprising:

applying a first voltage potential difference between the first electrode and the movable electrode so as to drive the movable electrode to a position substantially in contact with a dielectric layer, wherein a force is created attracting the movable electrode towards the dielectric layer;

applying a second voltage potential difference between the first electrode and the movable electrode and a third voltage potential difference between the second electrode and the movable electrode so as to overcome the force attracting the movable electrode towards the dielectric layer and to drive the movable electrode away from the dielectric layer;

applying a fourth voltage potential difference between the third electrode and the movable electrode; and applying a fifth voltage potential difference between the fourth electrode and the movable electrode, wherein the force attracting the movable electrode towards the dielectric layer is based at least in part on the fourth and fifth voltages.

22. The method claim 21, wherein the force comprises a stictional force.

23. A method of fabricating a multistate light modulator, the method comprising:

forming first and second electrodes;

forming a movable reflector comprising an electrically conductive material, the movable reflector positioned between the first and second electrodes, the movable reflector being movable between an undriven position, a first driven position, and a second driven position, wherein the first driven position is closer to the first electrode than is the undriven position and wherein the second driven position is farther from the first electrode than is the undriven position;

forming at least one third electrode adjacent to the first electrode; and forming at least one fourth electrode adjacent to the second elelctrode.

24. The method of claim 23, wherein forming the movable reflector comprises forming a fifth electrode.

25. A light modulator manufactured by the method of claim 23.

* * * * *